(No Model.) 3 Sheets—Sheet 2.
J. W. HELLWIG.
BICYCLE LOCK.
No. 572,798. Patented Dec. 8, 1896.
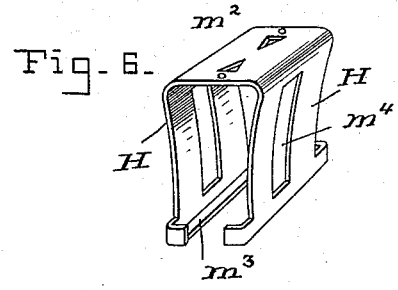
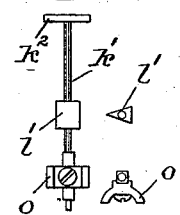
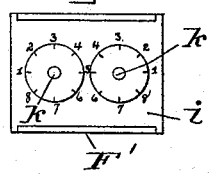
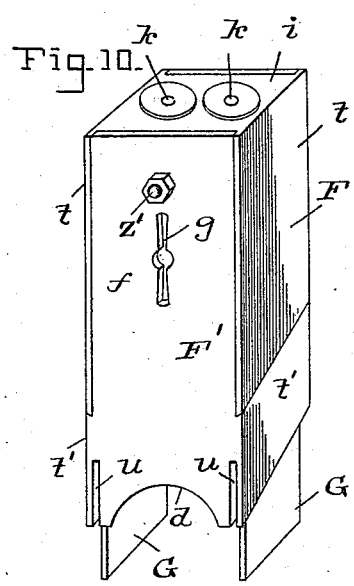
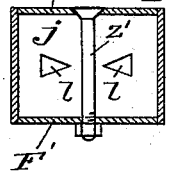
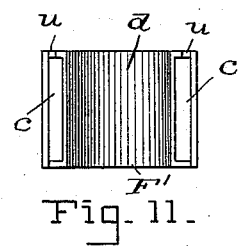
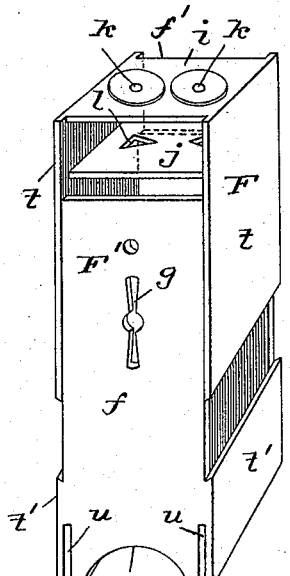
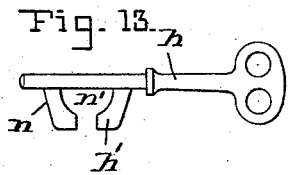
WITNESSES:—
Lee J. VanHorn.
Charles B. Mann Jr.
INVENTOR:—
J. W. Hellwig
By Chas. B. Mann
ATTORNEY.

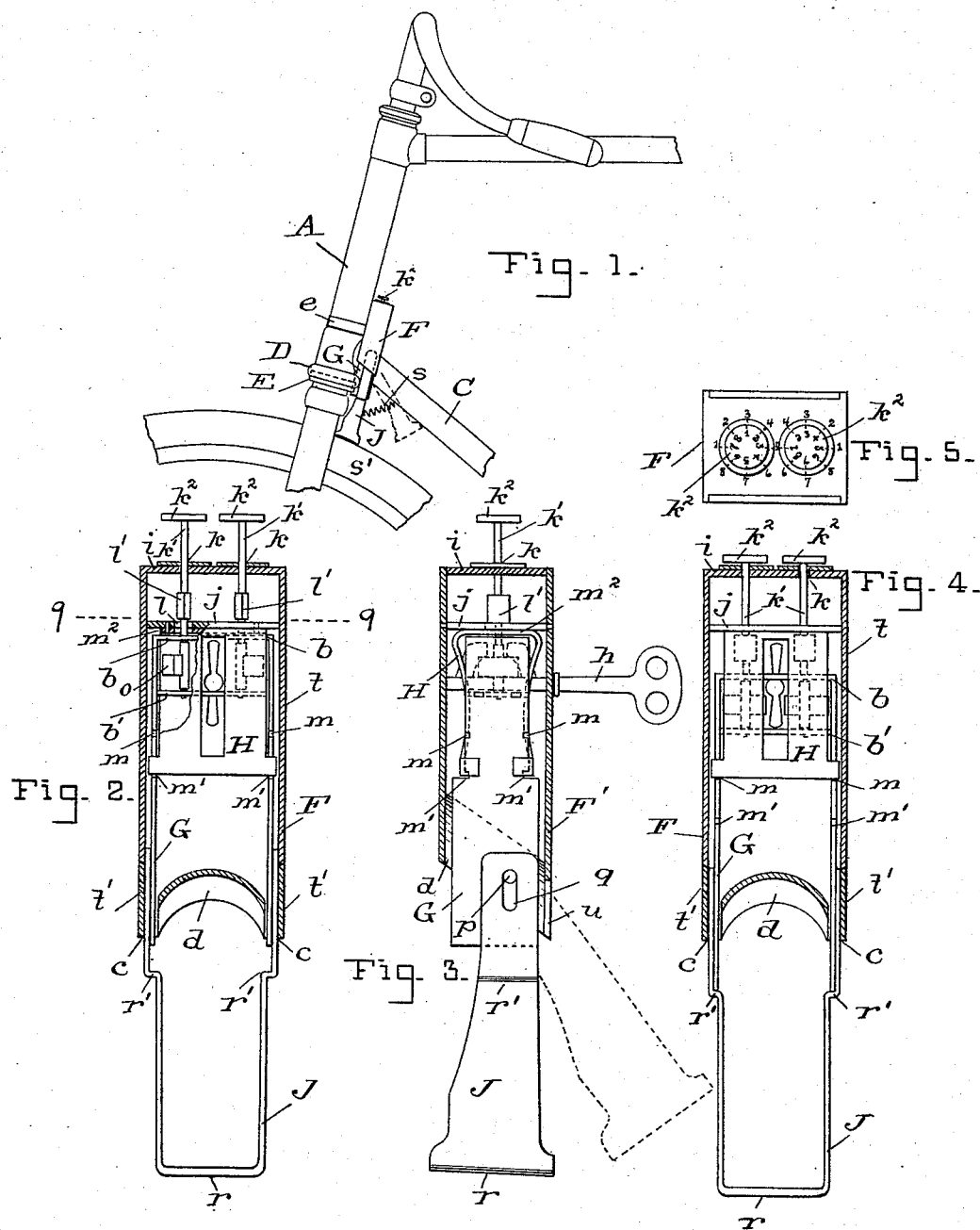

(No Model.) 3 Sheets—Sheet 3.
J. W. HELLWIG.
BICYCLE LOCK.
No. 572,798. Patented Dec. 8, 1896.
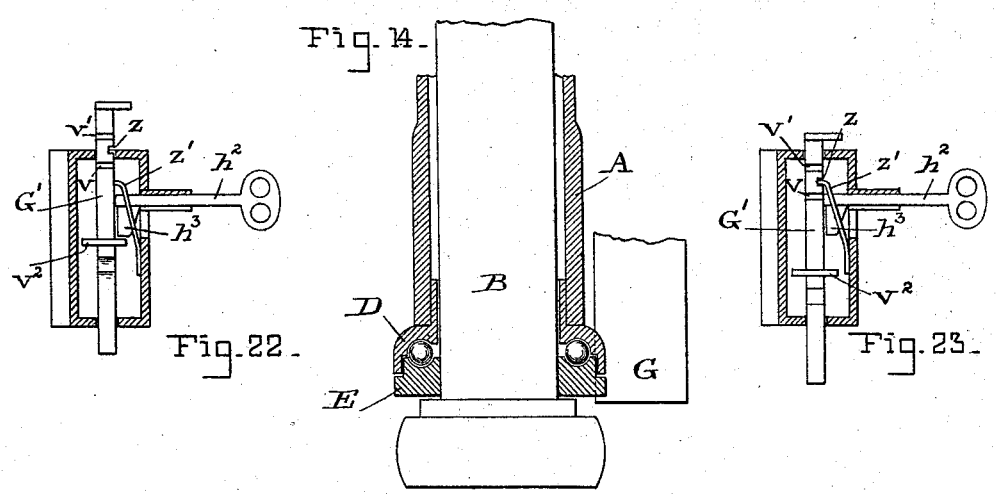
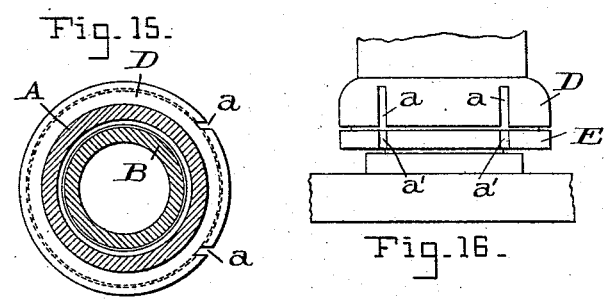
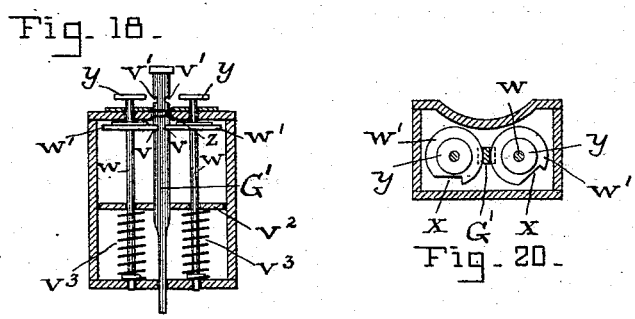
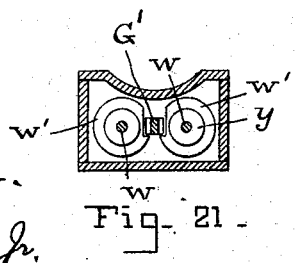
WITNESSES :—
Lee I. Van Horn.
Charles B. Mann Jr.
INVENTOR :—
J. W. Hellwig
By Chas B. Mann
ATTORNEY.

UNITED STATES PATENT OFFICE.

JUSTUS W. HELLWIG, OF BALTIMORE, MARYLAND.

BICYCLE-LOCK.

SPECIFICATION forming part of Letters Patent No. 572,798, dated December 8, 1896.

Application filed March 26, 1896. Serial No. 584,940. (No model.)

*To all whom it may concern:*

Be it known that I, JUSTUS W. HELLWIG, a citizen of the United States, residing at Baltimore, in the State of Maryland, have invented certain new and useful Improvements in Bicycle-Locks, of which the following is a specification.

This invention relates to a lock device for bicycles. Riders of bicycles have found that it is a risky exposure of their machine to leave it at the street-door unattended, as thieves may at any time take it off. While it is obviously desirable to prevent the machine from being stolen, it is also desirable to prevent the machine from being used either at home or elsewhere without the owner's consent.

One object of this invention is to provide an attachment of improved construction which may be applied to any bicycle for locking the post and fork and preventing it from swiveling, and another object is to combine with such locking device means for preventing the front wheel of the bicycle from revolving.

The invention is illustrated in the accompanying drawings, in which—

Figure 1 shows the handle-bar, the front end of the frame, and a part of the front wheel of a bicycle with my lock device attached. Fig. 2 is a vertical section of the complete lock device, the bolts being up. Fig. 3 is also a vertical section of same, but taken in a transverse direction. Fig. 4 is a similar view to Fig. 2, but shows the bolts down. Fig. 5 is a top view of the lock-case and buttons. Fig. 6 is a double spring-detent to hold the bolts either up or down. Fig. 7 is a view of one of the stems and shows two views each of the dog and tumbler. Fig. 8 is a top view alone of the case. Fig. 9 is a horizontal view of the case on line 9 9 of Figs. 2 and 10. Figs. 10, 11, and 12 are views showing the construction of the case. Fig. 13 is a view of the key. Fig. 14 is a sectional elevation of the post, its collar, front tube of frame, and swell-flange inclosing the ball-bearing. Figs. 15, 16, and 17 show details of the parts seen in Fig. 14. Figs. 18, 19, 20, and 21 show a modified form of lock device. Figs. 22 and 23 are vertical sections of the modified form of lock, showing a view transverse to that seen in Figs. 18 and 19.

Referring to Figs. 1 to 17, inclusive, the frame of a bicycle has a front tube A, through which the post B passes, the lower front bar C, and a swell-flange D on the front tube below the said lower bar. The post B carries a collar E, which fits below and in contact with the said swell-flange D for the purpose of guiding the bicycle, the collar and swell-flange having a ball-bearing and together act as a sort of "fifth-wheel." Now one of the features of my invention is to provide a device which will so apply to these two parts—the swell-flange D and the collar E—as to lock them and prevent the post and fork from swiveling. A case F contains two sliding bolts G. When pressed down, these bolts engage both of the said two parts D E, and thereby prevent the post-fork and front wheel from swiveling. The swell-flange D and collar E each have two notches $a\ a'$, (see Fig. 16,) and when these notches on the flange are in position coincident with the notches on the collar the two sliding bolts may engage both sets of notches and thereby lock the two parts together.

The two sliding bolts G are connected at the top by a cross-bar $b$ and at a short space below the top with another cross-bar $b'$. Each bolt has position at an opposite side of the case F, and each projects downward through a slot $c$ in the concave bottom $d$ of the case. This concave bottom is also inclined in order to fit on top of the lower front bar C of the bicycle-frame. The case stands upright against the front tube A of the frame and is secured thereto by a clip $e$. The two bolts G come down on opposite sides of the lower front bar C. The face-wall $f$ of the case has a keyhole $g$, and a key $h$ is employed to raise and lower the said two bolts. The keyhole has an enlarged center, and a slot is both above and below said center, thereby permitting the key to be entered in two positions—one position when the two bolts are up and the other position when they are down. The enlarged center of the keyhole serves as a pivot-bearing for the stem of the key to turn in. When the key is entered into the hole $g$, it must have position in the space between the two cross-bars $b\ b'$, because in turning the key ward-bridge $h'$ must either press up against the bar $b$ or down upon the bar $b'$ to move the bolts.

The case F has a top plate $i$ and an auxiliary plate $j$ a short distance below said plate. The top plate has two round holes $k$, through which the stems $k'$ of the tumblers pass, and the auxiliary plate has two irregular or special shaped holes $l$, through which the dogs $l'$ on the stems pass. In the present instance the holes $l$ are triangular-shaped, being larger on two sides than on the third side. This makes the hole a long taper or V shape. The long points of the two holes point toward each other in the present instance. The dogs $l'$ have a shape corresponding to these irregular or special shaped holes, and these dogs can pass through said holes only when the stems are turned to present the corresponding shapes of said dogs coincident with the like shapes of the holes. When these conditions exist, the two bolts G can be raised or lowered as their down and up position warrants, and until the stems $k'$ are so turned it is impossible to either raise or lower said bolts.

The stems $k'$ have their lower ends secured to the two cross-bars $b$ $b'$ of the sliding bolts in such manner as to allow the stems freedom to turn.

Each edge of the two plates which form the bolts G has a notch $m$ and a notched shoulder $m'$, and a double spring-detent (see Figs. 2, 3, and 6) is employed to coact with the said notches and shoulders to hold the bolts down or up, as the case may be. This double detent comprises two pendent spring-jaws H, connected at the top by a cross-plate $m^2$. The two jaws at their lower edges have inward-projecting flanges $m^3$, which engage said notches $m$ when the bolts are down and the notched shoulders $m'$ when the bolts are up. The double detent is fixed or secured to the auxiliary plate $j$ and is immovable. The cross-plate of the detent has two special-shaped holes like those marked $l'$ in the auxiliary plate. The normal tendency of these two spring-jaws is to press toward each other, and when the key $h$ is inserted it enters the slot $m^4$ and the ward-bridge $h'$ of the key has position between the two spring-jaws. The contour of the ward-bridge $h'$, exteriorly, is somewhat wedge-shaped, as at $n$, (see Fig. 13,) and in turning this exterior wedge shape forces the two spring-jaws apart and thereby disengages them from the notch $m$ or notched shoulder $m'$, as the case may be, and the key having first disengaged the detent will then either press up against the bar $b$ to unlock or will press down upon the bar $b'$ to lock.

The "tumbler" (see Fig. 7) is a segment-shaped block $o$, attached at one side of the stem $k'$. Both of these tumblers are involved when the key is to be turned to unlock or lock. The key ward-bridge $h'$ has an internal notch $n'$ widest at the stem and of shape which is adapted in turning to pass the segment-shaped tumbler-blocks $o$. The two stems $k'$, therefore, must be turned, so as to present these segment-blocks in position that will allow the notch $n'$ on the key to pass over them. As long as these blocks $o$ are not in proper position it will be impossible for the key to turn. Hence, even with the key, a stranger to the "combination" would have much trouble and delay in unlocking the device. In order to turn and set the stems properly, an index is provided on top of the case F. A circle is on the case-top around each hole $k$, (see Figs. 5 and 8,) and a series of numbers "1" to "8," and each stem $k'$ has at its top a disk $k^2$, also provided with a series of numbers "1" to "8." Now each bicycle owner may have these two series of numbers adjusted, primarily, to suit himself, so that different bicycles will be adjusted differently, and it will be necessary to know the combination in order to be able to promptly set the stems.

From the foregoing description it will be understood that when the two bolts G are forced down by the key said bolts will engage the notches $a$ $a'$ on the swell-flange D and collar E, and thereby the post and front wheel are prevented from swiveling. This is one feature of my invention.

Another feature of my invention is the device to prevent the front wheel from revolving—in other words, to hold it fast, so that it cannot turn. This device is shown in Figs. 1 to 4, inclusive. It comprises a tire-presser J, which is jointed to the lock-bolt G. The joints or pivots $p$ are on the bolts, and the presser is yoke-shaped and hangs pendent from the pivots like a swing. Each arm of the presser has a vertical slot $q$, which engages the pin $p$. Thus the presser J is not only pivoted, but there is a certain limited independent movement between the bolts and tire-presser. The bottom or foot $r$ comes in contact with the pneumatic tire, and when pressed thereon prevents the wheel from revolving. Each arm of the presser has a shoulder $r'$ below the end of the bolt G, and when the foot $r$ rests on the tire the bolts G will move downward by virtue of the slot $q$ until the ends of the bolts bear upon said shoulders $r'$. When the bolts G are raised to unlock, the pivoted tire-presser J is swung up away from the tire and kept in contact with the lower front bar C by a light spring $s$. The tire-presser may be differently pivoted, and need not be pivoted to the lock-bolt.

The presser J may be placed by hand so that its foot $r$ will rest on the tire $s'$ or, if said presser is held by a light spring swung up to the lower front bar C, it may be forced down and its foot placed on the tire by simply pressing on the disks $k^2$. In this case, as the bolts G are pushed down their lower ends will bear upon the shoulders $r'$ of the presser J while it is in an inclined position, and the light spring $s$, which holds the presser, will then yield and allow the presser to be swung to the down position, as shown in Fig. 1, where its foot may press on the tire $s'$ and act as a brake to prevent the wheel from revolving. The case is made in two parts F F', so constructed that they may be slipped together endwise. The part F comprises the top plate *i*, the auxiliary plate *j* below the top, and two opposite partial side walls *t*. At opposite edges the top plate is cut away or short, as at *f'*, to receive the upper ends of the walls *f* on the other part. The other part F' comprises two complete opposite walls *f*, the concave bottom *d*, and a portion of the other walls *t'*, which, with the partial walls *t* of the other part F, complete said walls. This part F' also has the keyhole *g*, and at the lower end at each side has a slot *u*, through which the arms of the tire-presser J project when the presser is swung up to an inclined position. A bolt *z'* holds the two parts F F' together.

My invention is not limited to a lock having two bolts which move downward and engage both the flange D and collar E, nor is it limited to the construction hereinbefore described. To illustrate, another construction of lock is shown in Figs. 18 to 23, inclusive, where only one downward-moving bolt is shown.

In Fig. 18 the bolt G' is raised or in the unlocked position, and in Fig. 19 the bolt is down or in the locked position. This bolt has two sets of side notches *v v'*, one set above the other. Two stems *w* are mounted in the case, one each side of the bolt. Each stem carries a disk *w'*, which has a portion *x* of its rim removed. The rims of these disks fit in one set or the other set of notches. The stems have on their upper end a button or head *y*, by which they are turned. It will be seen that when the two disks *w'* engage the lower set of notches *v* the bolt G' is kept up, as in Fig. 18, and when they engage the upper set of notches *v'* the bolt will be kept down, as in Fig. 19. Fig. 20 illustrates the disks in engagement with one of the notches on the bolt, and Fig. 21 illustrates the removed portion *x* of the disk rim in position adjoining the bolt. In this latter position of the disks the bolt may be either raised or lowered. A cross-bar *v²* is fixed on the bolt G' and has holes through which the two stems pass. A spiral spring *v³* is around each stem below the cross-bar. When the bolt is down, the springs are compressed, and these springs serve to lift the bolt when the disks *w'* are disengaged from the bolt-notches. The bolt also has on another side a notch *z*, and a detent-spring *z'* is on the inside of the case and is secured to the front thereof, and the free end of this detent engages the said notch *z* when the bolt is down, (see Fig. 23,) so that this detent will prevent an unauthorized person from unlocking or raising the bolt, even though the two disks *w'* were not engaged with the notches *v*. A key *h²* has a ward-bridge *h³*, which is inclined at one edge, and said edge takes under the detent-spring when the key is turned to unlock and disengage the detent from the notch *z* on the bolt, and is then in position for the bolt to be raised. The form of lock device shown in the last four figures is designed to be attached to the front side of the frame-tube A.

It will be seen my invention may be employed to lock the parts so as to prevent the front wheel from swiveling only, or it may be employed both to prevent said wheel from swiveling and to prevent it from revolving. The device is thus adapted to accomplish the desired objects.

Having thus described my invention, I claim—

1. The combination, in a bicycle, of the front tube and swell-flange the latter having a slot; the swiveled post in said tube and the collar on the post below said flange, and said collar also having a slot; a case secured to the front tube; a vertically-moving bolt sliding in said case and when down engaging the slots in both the swell-flange and collar and preventing the post from swiveling; and a key to move said bolt, substantially as and for the purpose set forth.

2. The combination in a bicycle, of the front tube of the frame; the lower front bar of the frame; the swiveled post in said tube; a lock device having two connected parallel locking members each of which move on opposite sides of said lower front bar and when down engage both the said front tube and said post, and thereby prevent the post from swiveling; a double detent to engage both locking members and hold them immovable in either the up or down position; a revoluble stem in the case which must be first set in a predetermined position before the locking members can be moved; and a key to move said locking members.

3. The combination in a bicycle, of the front tube of the frame; the lower front bar of the frame; the swiveled post in said tube; and a lock device having two parallel members each of which move on opposite sides of said lower front bar and engage both the said front tube and said post, and thereby prevent the post from swiveling.

4. In a bicycle, the combination of the front tube of the frame; the post which swivels in said tube; a lock device which in a certain position engages both of said parts to prevent the post from swiveling; and a device coacting with said lock device to prevent the front wheel from revolving.

5. In a bicycle, the combination of the front tube of the frame; the post which swivels in said tube; a lock device having two parallel members and vertically movable and engaging both the front tube and said post; and a tire-presser coacting with said lock device.

6. In a bicycle, the combination of the front tube of the frame; the post which swivels in said tube; a lock device having two parallel members and vertically movable and engaging both the front tube and said post; and a tire-presser having two arms each provided with a shoulder, *r'*, and said arms pivoted to the two parallel members of the lock device and having a limited independent movement at the said pivot connection.

7. A bicycle-lock device having in combination two vertically-movable bolts, and a rectangular case made in two parts, F, F', each part carrying two opposite walls and said parts sliding together endwise, one of said parts having a concave bottom, $d$, and at each lower part of said bottom a slot, $c$, through which the said bolts project.

In testimony whereof I affix my signature in the presence of two witnesses.

JUSTUS W. HELLWIG.

Witnesses:
   CHAS. B. MANN,
   CHARLES B. MANN, Jr.